July 13, 1965 R. T. ADAMS 3,195,059

DEMODULATOR SYSTEM FOR ANGULARLY MODULATED SIGNALS
HAVING IMPROVED NOISE IMMUNITY

Filed July 8, 1960

INVENTOR.
ROBERT T. ADAMS

BY Alfred C. Hill

AGENT

United States Patent Office 3,195,059

Patented July 13, 1965

3,195,059

DEMODULATOR SYSTEM FOR ANGULARLY MODULATED SIGNALS HAVING IMPROVED NOISE IMMUNITY

Robert T. Adams, Short Hills, N.J., assignor to International Telephone and Telegraph Corporation, Nutley, N.J., a corporation of Maryland Filed July 8, 1960, Ser. No. 41,590
12 Claims. (Cl. 329—122)

Figure 1:
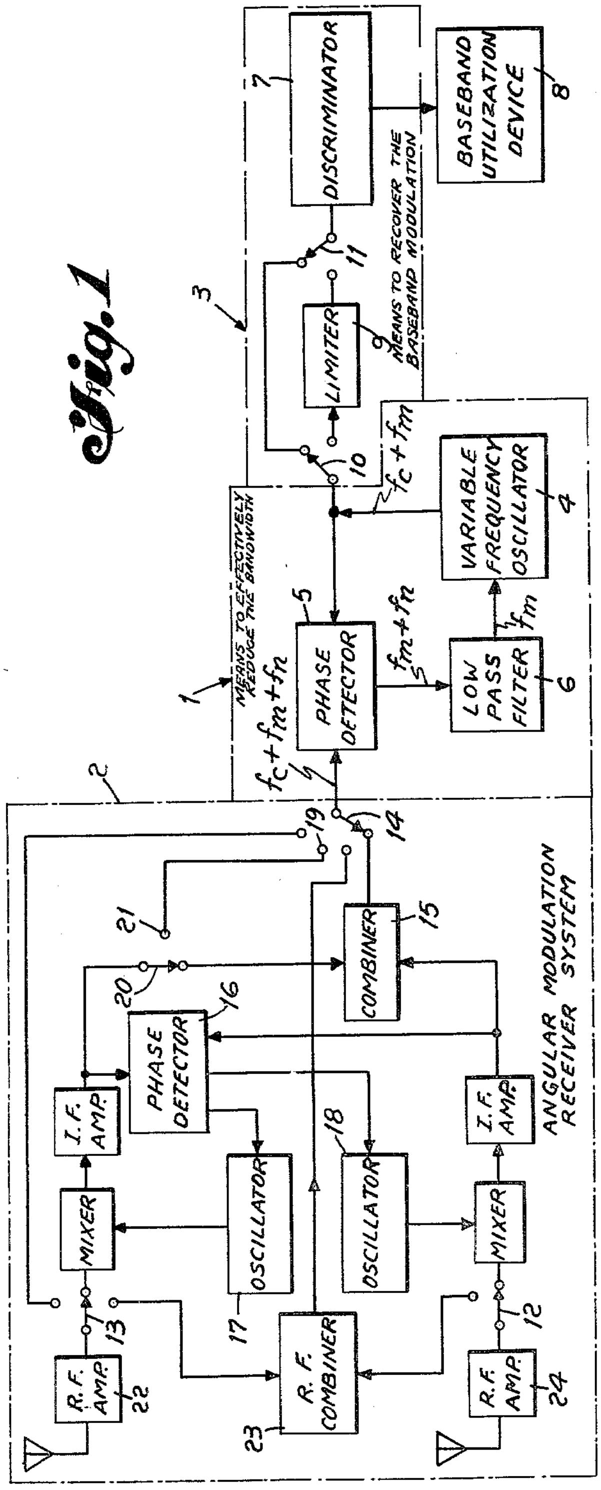

This invention relates to demodulators and more particularly to an improved demodulator system to be employed in angularly modulated signal receiver systems.

In the present state of the communication art there is an ever present search for means and methods of obtaining high quality, reliable performance. To this end wideband angular modulation communication systems, such as frequency modulation (FM) communication systems are being employed since these systems have an inherently high reliability due to their immunity to noise. As is well known an angular modulation receiver is characterized by a threshold point, above which the signal-to-noise ratio of the demodulated intelligence increases linearly with the received signal level. Below this threshold point there is a very rapid deterioration of signal-to-noise ratio as the received signal level falls. This threshold level, therefore, determines the point at which the angular modulation communication system fails. As is known, it is a characteristic of angular modulation systems that bandwidth can be traded for signal-to-noise ratio, that is, an increase in signal-to-noise ratio requires an increase in bandwidth. This generally results in an increase in the threshold point. To prevent this increase in the threshold point, it is necessary to increase the carrier power. In any communication system where the received signal may drop below the threshold point, such as in over-the-horizon systems, system reliability, that is, the maintaining of the received signal above the threshold point for a given percent of time, was originally obtained by increased transmitter power, increased antenna diameter and/or diversity receiving systems. Recently more economical arrangements are being employed to improve the reliability of angular modulation communication systems. These arrangements operate to lower the threshold point of the angular modulation receiver, that is, provide threshold extension. This will enhance the reliability since the receiver can respond to signal which has a poorer signal-to-noise ratio than heretofore. Also for a given reliability specification the same arrangements will enable a reduction of the transmitter power requirement.

In general threshold extension is obtained by reducing the effective bandwidth of the angular modulation receiver, or in other words, a reduction of the modulation index of the signal, after the radio frequency amplifier in the intermediate frequency (IF) section of the receiver. This reduction of effective bandwidth reduces the receiver noise and, hence, improves the signal-to-noise ratio of the received carrier in the IF pass band. Therefore, since the threshold point depends on the signal-to-noise ratio of the receiver carrier in the IF section of the receiver, reduction of noise at that point will lower the threshold point. Thus, with the lower threshold point the receiver will respond to signals having a lower signal-to- noise ratio.

Certain techniques that have been employed to obtain threshold extension utilize the signal-to-noise ratio of the demodulator output to either switch from the standard wideband IF channel to narrow band standby channel, or to automatically and continuously adjust appropriately the IF bandwidth. In both cases, the standard IF bandwidth for average signal-to-noise ratios was already restricted to the minimum absolutely necessary for optimum performance. It is, therefore, obvious that any further bandwidth reduction while yielding some threshold improvement also introduces very serious distortion which prohibits the use of such methods in high quality multiplex systems. Other techniques which have been successfully employed in the past consist of transforming a wide band angular modulation signal of high modulation index into a narrow band angular modulation signal of low modulation index in the receiver before demodulation takes place. This is accomplished by using the demodulated baseband output of the angular modulation receiver to angularly modulate the local oscillator so that the instantaneous local oscillator frequency follows the instantaneous incoming signal frequency. The resultant IF deviation will then be considerably less than the incoming RF radio frequency deviation. The high modulation index signal entering the receiver provides the usual and desirable angular modulation improvement resulting in a high baseband signal-to-noise ratio. This latter arrangement has been termed "frequency compression" and suffers from the disadvantage of being critical in circuit adjustments primarily due to the inclusion of a large number of phase distortion circuits in the overall feedback loop. The frequency compression technique includes in the feedback loop the receiver local oscillation mixer, all the IF stages, limiters and discriminator as well as a baseband amplifier and filter.

Therefore, an object of this invention is to provide an improved demodulator system for a broadband angular modulation receiver employing frequency following techniques overcoming the disadvantages of the prior art arrangements mentioned hereinabove.

Another object of this invention is to provide a demodulator system for a broadband FM receiver permitting realization of the FM improvement of the broadband receiver and providing a threshold point equivalent to a narrow band system which is simpler and less complicated than the frequency compression threshold extension demodulator system.

A feature of this invention is the provision of a demodulator system for angularly modulated signals having a given modulation index greater than unity comprising a means responsive to said modulated signals to reduce said given modulation index and a means coupled to said means to reduce to recover the baseband of said modulated signals.

Another feature of this invention is the provision of an oscillator inserted in a broadband FM receiver just prior to the FM discriminator which is locked inphase with the IF version of the received signal by means of an automatic phase control loop including a phase detector and a low pass filter. The baseband of the modulated signal may be recovered directly at the output of the low pass filter, or at the output of the oscillator by means of a discriminator alone or a limiter-discriminator combination.

Figure 2:
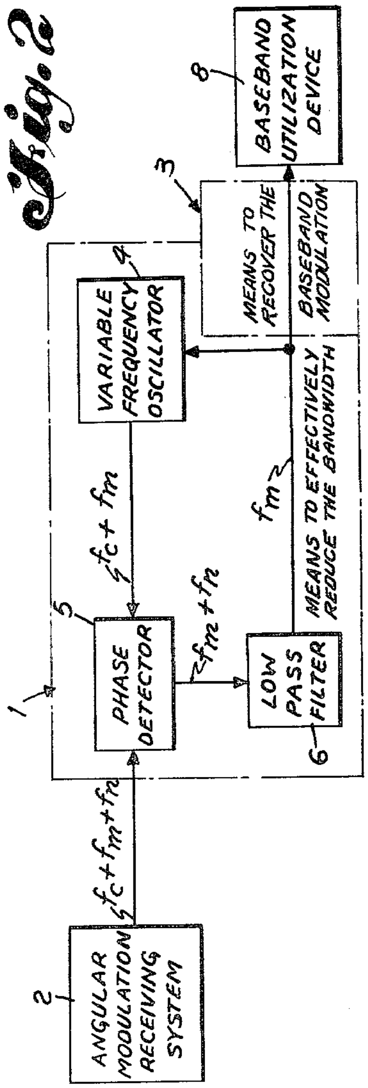

The above-mentioned and other features and objects of this invention will become more apparent by reference to the following description taken in conjunction with the accompanying drawings, in which:

FIG. 1 is a schematic diagram in block form of a demodulator system following the principles of this invention; and FIG. 2 is a schematic diagram in block form of an alternative arrangement of the demodulator system of FIG. 1.

Referring to FIG. 1, the demodulator system in accordance with this invention includes means 1 coupled to a source 2 having output signals including a center frequency ($f_c$) angularly modulated by intelligence ($f_m$) and out-of-band noise ($f_m$) and means 3 coupled to means 1 to recover baseband modulation ($f_m$) of the modulated signals therein. Means 1 operates on the output signal of source 2 to reduce the effective bandwidth of the receiver, or in other words, the modulation index of the output signal of source 2 and, hence, reduce the receiver threshold point. More specifically, means 1 includes a variable frequency or frequency modulated oscillator 4, such as an oscillator having its frequency under control of a reactance tube or the like, which is locked inphase with the frequency ($f_c+f_m$) of the output signal of source 2 by means of a phase control or phase lock loop including phase detector 5 and low pass filter 6. Phase detector 5, such as a balanced modulator, provides a control signal including a direct current voltage proportional to the phase difference between the output signal of source 2 and oscillator 4 and the alternating current baseband modulation and out-of-band noise. It should be noted that if detector 5 is a balanced modulator that the reference phase relationship between the input signals is 90 degrees. Thus, oscillator 4 is adjusted to have a center frequency ($f_c$) identical to the center frequency ($f_c$) of the output signal of source 2 which is then modulated by baseband modulation ($f_m$). The presence of low pass filter 6 removes the high frequency noise or out-of-band noise ($f_m$) from the alternating current component of the control signal of detector 5 and, hence, oscillator 4 is not modulated by the high frequency noise. This results in an output signal from oscillator 4 that does not contain angular modulation noise of the type yielding out-of-band noises at baseband. The elimination of the noise in the phase lock loop causes means 3 to exhibit a lower threshold approximately equal to the threshold of narrow band angular modulation systems while continuing to yield the normal angular modulation improvement for the actual modulation index used. It has been found that with a modulation index of three the threshold is moved about 10 db (decibel) lower than normal and the signal-to-noise ratio in this region is about 20 db better. In the arrangement illustrated in FIG. 1, means 3 is shown to include a discriminator 7 which will detect the angular modulation intelligence which may then be passed to baseband utilization device 8. It is illustrated in FIG. 1 that the output of oscillator 4 may be coupled directly to discriminator 7 provided that the output amplitude of oscillator 4 is constant, as can be accomplished by proper design of the oscillator and, therefore, will enable the elimination of limiter 9 which is normally employed to remove amplitude variations in angular modulated signals. If it is found that the amplitude of the output signals of oscillator 4 is not constant, limiter 9 may be placed in tandem arrangement with discriminator 7 to perform its usual function by proper positioning of switches 10 and 11.

It should be pointed out that the lowest practical value of the receiver IF bandwidth is detremined by two times the lowest modulating frequency. Hence, the passband of filter 6 should be no less than two times the baseband.

In the illustration of FIG. 1, source 2 is illustrated to include various arrangements to apply a carrier signal of either radio frequency level or intermediate frequency level to one input of phase detector 5. With switches 12, 13 and 14 in positions illustrated, source 2 is a diversity reception system referred to as an equal gain or phase combiner wherein the IF signals applied to combiner 15 are phase detected in detector 16 to produce a control signal which controls in push-pull manner oscillators 17 and 18 to adjust the phase relationship of the signals applied to combiner 15 to assure inphase combining of these signals in combiner 15 prior to coupling to phase detector 5.

Another form which source 2 may assume is a conventional angular modulation receiver. This form is illustrated with switch 14 placed in contact with contact 19 and switch 20 placed in contact with contact 21. In this arrangement the IF signal from the conventional receiver would be coupled to the input of phase detector 5. Such a receiver might be employed in line-of-sight communication systems, or other types of communication systems wherein it is not necessary to employ diversity techniques to overcome the fading of the signals propagated.

Still another form source 2 may assume is amplifier 22 and the associated antenna with the output of amplifier 22 coupled directly to the input of phase detector 5 by appropriate positioning of switches 13 and 14. Under this condition it would be necessary that the oscillator 4 have the same mean or center frequency as the radio frequency carrier so that oscillator 4 may be locked inphase with the radio frequency carrier and the baseband modulation plus noise appears at the output of detector 5.

A further form source 2 may assume is another diversity arrangement including radio frequency combiner 23 which would include those components and phase control arrangements necessary to assure that the outputs of amplifiers 22 and 24 are inphase in combiner 23 for the proper inphase combining therein. The output of combiner 23 then would be coupled to phase detector 5 and the remainder of the demodulator system would operate as described hereinabove. The proper positioning of switches 13 and 14 would be needed, of course, to provide this form of source 2.

It will be noted that the phase control loop in the demodulator system of this invention does not cause a reduction in frequency deviation at any point in the receiver as was required in the prior art frequency compression system mentioned hereinabove. The threshold extension advantage is obtained in the demodulator system of this invention by reduction of noise deviation compared to modulating signal deviation of the carrier as transferred to the phase locked oscillator 4. Hence, threshold extension is obtained independent of modulating signal deviation.

Referring to FIG. 2, there is illustrated therein a substantially identical arrangement of source 2 and means 1 as described hereinabove with respect to FIG. 1. However, it will be observed that means 3, the means to recover the baseband, is merely a conductor connected to the output of filter 6 to couple the baseband signal at the output of filter 6 to utilization device 8. Thus, it is possible with the demodulator system of this invention to remove the intelligence in two different ways from the phase lock loop of this arrangement. It would be preferable in a high quality system to utilize the arrangement of FIG. 1, since the output signal-to-noise ratio and the distortion at the output of oscillator 4 is better than the signal-to-noise ratio and distortion at the output of filter 6 since the relative phase error of the output signal of oscillator 4 with respect to the output signal of source 2 is less than that of the baseband signal in the loop. This is true since the baseband signal in the loop actually contains the error signal, D.C. in nature, proportional to the phase difference between the output signal of source 2 and the output signal of oscillator 4.

The threshold extension type of demodulator system described herein provides an improvement in that, without changing the transmitter frequency deviation, the full extent of the phase lock loop can be used to reduce the receiver IF bandwidth with respect to the conventional value. The result is the same baseband output signal-to-noise ratio that may be obtained with the modulation index used but the threshold is now at its lowest realizable value. While this type of improvement is obvious for the threshold extension system, there are alternative improvements obtainable. First, if the threshold point is satisfactory but an increase of signal-to-noise ratio is desired above threshold the receiver IF bandwith may be left unchanged and the transmitter frequency deviation can be increased by an amount determined by the realizable receiver feedback. This results in the same threshold as before, but the baseband output signal-to-noise ratio will increase proportionally to the actual feedback. In conventional systems, it is necessary to accompany an increase in deviation with an increase in transmitter power to retain the same threshold and, hence, the same fading margin. In these conventional systems, with no increase in transmitter power, a loss in threshold would be suffered due to the increased receiver bandwidth that is necessary to pass the wider frequency excursions. If in conventional systems the bandwidth were left unchanged in order to leave the threshold point undisturbed, there would be an intolerable increase in distortion and intermodulation noise. Second, it is possible to obtain improvement in both threshold and in signal-to-noise improvement above threshold in a system operating with greater than unity index by using the system described herein and increasing the deviation. Bandwidth reduction to twice the highest modulating frequency will lower the threshold, while an increase in deviation will increase the signal-to-noise ratio above threshold. The overall amount of both changes is given by the actual receiver feedback in phase lock loop. For instance, in the case of 8 db overall voltage feedback, the transmitter frequency deviation may be doubled yielding 6 db improvement in the output signal-to-noise ratio. At the same time, the receiver IF bandwidth may be reduced to one quarter of the original value, provided this is greater than two times the baseband, resulting in a threshold 6 db lower than before. The combined effect is equal to a virtual 6 db increase of the transmitter output power with all other parameters of the link at the conventional values.

While I have described above the principles of my invention in connection with specific apparatus, it is to be clearly understood that this description is made only by way of example and not as a limitation to the scope of my invention as set forth in the objects thereof and in the accompanying claims.

I claim:

1. A demodulator system for angularly modulated signals comprising:

a source of angularly modulated signals including a carrier signal angularly modulated by both baseband and random noise, said baseband frequency deviating said carrier signal a large amount to provide a relatively large noise immunity and a given threshold level for said demodulator system;

means coupled to said source responsive to said modulated signals to remove that portion of said angular modulation noise above the frequency band of said baseband to provide a threshold level for said demodulator system lower than said given threshold level and yet maintain said large noise immunity for said demodulator system due to the large amount of frequency deviation of said carrier signal by said baseband;

means coupled to said means to remove to recover said baseband.

2. A system according to claim 1, wherein said means to remove includes a low pass filter to pass said baseband and remove said portion of said angular modulation noise.

3. A system according to claim 2, wherein said means to recover is coupled to the output of said low pass filter.

4. A demodulator system for angularly modulated signals comprising:

a source of angularly modulated signals including a carrier signal angularly modulated by both baseband and random noise, said baseband frequency deviating said carrier signal a large amount to provide a relatively large noise immunity and a given threshold level for said demodulator system;

a control circuit including a variable frequency oscillator having a normal operating frequency equal to the frequency of said carrier signal, a phase detector coupled to the output of said oscillator and the output of said source to provide a control signal indicative of the frequency difference between said modulated signal and the output signal of said oscillator, and means coupling said control signal to said oscillator to vary the frequency of said output signal in accordance with said baseband to lock the frequency of said output signal to said carrier and said baseband only to provide a threshold level for said demodulator system less than said given threshold level and yet maintain said large noise immunity for said demodulator system due to the large amount of frequency deviation of said carrier signal by said baseband; and means coupled to said control circuit to recover said baseband.

5. A system according to claim 4, wherein said means coupling said control signal to said oscillator includes a low pass filter to pass said baseband and to remove that portion of said angular modulation noise above the frequency band of said baseband to provide said threshold level less than said given threshold level.

6. A system according to claim 5, wherein said means to recover is coupled to the output of said low pass filter.

7. A system according to claim 5, wherein said means to recover is coupled to the output of said oscillator.

8. A system according to claim 7, wherein said means to recover includes an angular modulation detector.

9. A system according to claim 7, wherein said means to recover includes an amplitude limiter; and an angular modulation detector coupled to the output of said limiter.

10. A system according to claim 9, wherein said means to recover is coupled to the output of said oscillator.

11. A system according to claim 10, wherein said means to recover includes an angular modulation detector.

12. A system according to claim 10, wherein said means to recover includes an amplitude limiter; and an angular modulation detector coupled to the output of said limiter.

References Cited by the Examiner

UNITED STATES PATENTS

| | | | |
|---|---|---|---|
| 2,332,540 | 10/43 | Travis | 329—124 |
| 2,554,391 | 5/51 | Tellier et al. | 329—125 |
| 2,735,983 | 2/56 | McLeod | 332—22 |
| 2,828,414 | 3/58 | Rieke | 329—50 X |
| 2,924,706 | 2/60 | Sassler | 329—50 X |
| 2,930,892 | 3/60 | Palmer | 329—131 X |
| 2,969,459 | 1/61 | Hern | 325—427 X |
| 3,084,327 | 4/63 | Cutler | 325—46 X |

ROY LAKE, *Primary Examiner.*

L. MILLER ANDRUS, JOHN KOMINSKI, *Examiners.*